Patented Apr. 17, 1945

2,374,101

UNITED STATES PATENT OFFICE 2,374,101

RUBBER RECLAIMING SOLVENT

Robert W. Jaeger, Chicago, Ill., assignor to Standard Oil Company, Chicago, Ill., a corporation of Indiana No Drawing. Application September 30, 1941,
Serial No. 413,041

7 Claims. (Cl. 260—713)

This invention relates to the reclaiming of vulcanized rubber and more particularly it relates to an improved solvent or devulcanization accelerator for use in the reclaiming of rubber. In the reclaiming of rubber from various sources such as mechanical rubber scrap and especially scrap rubber tires, it is generally the practice to separate the rubber from metal, etc., and grind it to a coarse powder together with any fabric which may be associated with it. The rubber is then "devulcanized" by heating with caustic and a plasticizing solvent. Heretofore, solvents employed for this purpose have usually been aromatic hydrocarbons derived from coal distillation. A fraction known as "terpineol" boiling approximately within the range of toluene and xylene has been added to the rubber and heated with a caustic soda solution containing about 8 to 10% of caustic. The temperature and time of heating will vary with the character of the rubber undergoing treatment but in a typical case it may be about 300° F. for a period of 5 to 10 hours. Ordinarily, about 5 to 10% of a rubber solvent may be present.

During this operation the rubber is partly desulfurized by the action of the caustic, and the cellulose is destroyed leaving the rubber a soft mass. The hydrocarbon solvent is largely removed from the product by steam distillation and the final reclaimed rubber product, after thorough washing with water, is customarily formed into slabs on rubber rolls. If desired, the fabric may be removed from the ground rubber before devulcanization by treatment with a suitable acid, for example, by heating with hydrochloric acid or sulfuric acid. For this purpose the rubber may be wet with dilute sulfuric acid and then dried at elevated temperature, followed by washing with water to remove the disintegrated cellulose. Devulcanization may be effected at atmospheric pressure by the use of higher concentrations of caustic, for example, 10 to 20%, while lower concentrations of caustic, for example, 4%, may be employed at higher temperatures, for example, 375° F. to 400° F., corresponding to a steam pressure of about 200 pounds per square inch gage. In carrying out the operation in a closed vessel, heating may be accomplished by direct injection of steam under pressure.

The action of the hydrocarbon solvent in the reclaiming of rubber is not clearly understood. It appears to have a physical action as a plasticizing solvent, softening the vulcanized rubber particles and permitting penetration by the alkaline reagents, thereby assisting materially in eliminating chemically combined sulfur and in effecting the depolymerization of the rubber molecule. It is also quite possible that a chemical combination occurs between a portion of the devulcanizing solvent or accelerator and the rubber molecule during desulfurization and depolymerization. Paraffin hydrocarbons from petroleum have not proved satisfactory as devulcanization accelerators although their ready availability would make their use very attractive.

An object of my invention is to provide a hydrocarbon devulcanization accelerator equal or superior to the terpineol accelerators heretofore employed. Another object of my invention is to produce an improved rubber devulcanization accelerator from petroleum. Still another object of my invention is to produce from petroleum a devulcanization accelerator comprising a mixture of hydrocarbons having an unbroken boiling range and substantially uniform solvent characteristics throughout its boiling range.

In making my improved rubber solvent, I subject petroleum hydrocarbons to catalytic conversion at high temperature. According to one method, I subject petroleum naphtha to the action of a solid, porous, dehydrogenating catalyst at a temperature of about 850° F. to 1050° F., preferably in the presence of hydrogen. A pressure of hydrogen of 100 to 400 pounds is desirable. Contact conditions of about one volume of naphtha per hour per volume of catalyst may be employed. The product of this reaction is a mixture of reformed naphtha suitable for gasoline of high knock rating and heavier hydrocarbons synthesized in the process, boiling largely above the boiling point of the naphtha charged. The heavier fractions appear to be largely aromatic and to contain liquid derivatives of naphthalene. However, the complexity of the mixtures in which they occur makes their composition uncertain.

Suitable catalysts for the operation just described are solid, dehydrogenation catalysts, usually oxides of metals of groups II to VI of the periodic system and particularly oxides of VIth group metals such as chromium, and molybdenum, preferably supported on active alumina or magnesia. An excellent catalyst is active alumina promoted with about 10% of molybdena.

The product obtained by the treatment of Mid-Continent heavy naphtha at 925° F. with such a catalyst is fractionated to produce a heavy fraction having the following boiling range, A. S. T. M.:

|  | °F. |
|---|---|
| Initial boiling point | 448 |
| 10% | 465 |
| 50% | 490 |
| 90% | 620 |

On redistillation this produce yielded 65% of a distillate having the following boiling range:

|  | °F. |
|---|---|
| Initial boiling range | 428 |
| 10% | 457 |
| 50% | 468 |
| 90% | 485 |
| Maximum | 512 |

Both products may be used in the reclaiming of rubber. The latter product was tested as a softener or devulcanization accelerator by adding about 5% to shredded scrap rubber and heating 4 hours at 400° F. under pressure with 200% of a caustic solution containing 4% of sodium hydroxide. All cotton was removed from the rubber by this treatment and the rubber was converted into a tough, plastic mass. The sulfur content was reduced from 1.83% based on the charge (including cotton) to 1.7% based on the final product. In a comparative test using about 10% of toluene instead of the above softener, the resulting rubber product was not as soft even though the amount of softener used was twice as much. This indicates a superior efficiency for my improved devulcanization accelerator which may be used in smaller amounts to give the same effect.

Another comparative test was made with my improved product from catalytic naphtha reforming in direct comparison with a commercial softener obtained from coal tar. After devulcanization under identical conditions the rubber from both products was worked into slabs on rubber rolls and it was found that the product made with my new softening agent was distinctly softer and more pliable showing that my solvent accelerates devulcanization to a greater extent than the commercial softener employed. This result is a true chemical effect and can not be due to the presence of the softener in the product inasmuch as a test of the finished product in both cases showed that no softener remained therein. This test was conducted by cutting up samples of both products and subjecting them to heating at 230° F. for a period of 8 hours in a vacuum corresponding to from 2 to 3 millimeters mercury pressure, absolute. No loss of weight occurred under these conditions.

In another set of experiments the swelling characteristics of the converted petroleum naphtha were determined. Samples of shredded rubber free from cotton cords and dust were placed in bottles to an equal height and approximately eight times the weight of hydrocarbon solvent was added. After 24 hours the amount of swelling was determined by measuring the height of the rubber in the sample bottles. Straight run petroleum naphtha and straight run kerosene produced the same amount of swelling, i. e., 214%, whereas the catalytically converted petroleum naphtha produced a swelling of 271% with the crude heavy fraction and also with the 65% distillate hereinabove referred to. A lighter fraction comprising 24% distillate from the crude heavy fraction gave a swelling of 300%.

In addition to the product obtained from the conversion of heavy naphtha with dehydrogenation catalysts, I may also employ products of similar boiling range obtained from the conversion of heavy oils such as gas oil with solid cracking catalysts at comparable conversion temperatures of the order of 850 to 1000° F. In carrying out the conversion of gas oils, hydrogen is usually not employed. Pressures of atmospheric to 50 pounds are preferred and catalysts of the alumina-silica type are desirable. Active silica promoted with about 5 to 30% of active alumina or magnesia may be employed, for example, at a temperature of 925° F. and a space velocity of about 1 to 3. Acid activated montmorillonite clay and other activated clays may be used as catalysts. The catalyst may be retained in a bed or suspended as a powder in the gas oil vapors. Residual oils may likewise be treated in this manner. The product of this conversion reaction may contain about 25 to 50% of light hydrocarbons boiling within the gasoline boiling range. Heavier hydrocarbons are fractionated and extracted with selective solvents such as phenol, furfural, acetone, etc. or separated by azeotropic distillation to eliminate therefrom undesirable paraffin hydrocarbons which are mainly unchanged hydrocarbons charged to the process. The remaining hydrocarbons, preferably a solvent extract, are suitable for use as rubber reclaiming solvents when fractionated to the desired boiling range.

Various modifications of my invention may be employed which will occur to those skilled in the art. Thus I may refine my devulcanization accelerator for improvement of color, odor, etc. by subjecting it to various treatments known to the art. For example, I may filter it through fuller's earth or I may treat it with caustic solutions or sodium plumbite for removal of mercaptans. I may also improve the color and odor by treating it with sulfuric acid of about 75 to 85% concentration followed by the usual water washing and neutralization. Redistillation of the product after the above treatment may be resorted to and it should be understood that I may prepare by distillation a product of any suitable boiling range, boiling above the end boiling point of gasoline, generally about 400° F. In those cases where it is undesirable that the solvent remain in the rubber, I may fractionate the product to a narrow boiling range whereas in other cases I may employ a wide boiling fraction, for example, boiling from 425° F. to 650° F. or even higher.

Although I have described my invention by means of certain specific examples, I intend that it be defined only by the scope of the following claims.

I claim:

1. The process of devulcanizing scrap rubber which comprises comminuting said rubber and subjecting it to the action of a hot caustic alkali solution, and a small portion of a devulcanization accelerator consisting essentially of a synthetic hydrocarbon fraction boiling within the range of about 425 to 650° F. obtained from the conversion of petroleum oils with a solid conversion catalyst consisting essentially of the oxides of metals of groups II to VI of the periodic system at a temperature between about 850 and 1050° F.

2. The process of claim 1 wherein said devulcanization accelerator is an aromatic extract of a heavy fraction resulting from the cracking of gas oil in the presence of said solid conversion catalyst.

3. The process of claim 1 wherein the amount of devulcanization accelerator employed is about 5 to 10% of the amount of scrap rubber treated.

4. The process of devulcanizing scrap rubber which comprises comminuting said rubber and subjecting it to the action of a hot caustic alkali solution and a small proportion of a devulcanization accelerator consisting essentially of a highly aromatic synthetic hydrocarbon fraction, boiling chiefly within the range of about 425 to 650° F., obtained from the conversion of petroleum oils at a temperature of about 850 to 1050° F. with a solid conversion catalyst comprised of silica and alumina.

5. The process of devulcanizing scrap vulcanized rubber which comprises comminuting said rubber and subjecting it to the action of a hot caustic alkali solution and a small amount of a devulcanization accelerator consisting essentially of an aromatic liquid hydrocarbon boiling within the range of about 425 to 650° F. prepared by subjecting a petroleum hydrocarbon to the action of a solid conversion catalyst comprising alumina promoted with an oxide of a group VI metal at a temperature of about 850 to 1050° F. and fractionating the product to produce the desired accelerator.

6. The process of devulcanizing scrap vulcanized rubber which comprises subjecting said rubber to the action of a hot caustic alkali solution and a small proportion of a devulcanization accelerator boiling within the range of about 425 to 650° F. prepared by subjecting the vapors of petroleum naphtha to the action of a group VI metal oxide dehydrogenation catalyst at a conversion temperature of about 850 to 1050° F. and separating from the product of said action a heavy synthetic hydrocarbon fraction boiling substantially above the boiling point of said heavy naphtha.

7. The process of claim 6 wherein said accelerator is prepared by treating said naphtha with said dehydrogenation catalyst in the presence of added hydrogen.

ROBERT W. JAEGER.